Sept. 11, 1956   B. H. MANN ET AL   2,762,350
INDUCTION SYSTEM FOR V-8 ENGINES
Filed March 14, 1955   3 Sheets-Sheet 1

INVENTOR.
BERTRAM H. MANN
LAURENCE M. GOODRIDGE
BY George R. Ericson
ATTORNEY

Sept. 11, 1956     B. H. MANN ET AL     2,762,350
INDUCTION SYSTEM FOR V-8 ENGINES
Filed March 14, 1955     3 Sheets-Sheet 2

*INVENTOR.*
BERTRAM H. MANN
LAURENCE M. GOODRIDGE
BY George R. Ericson
ATTORNEY

Sept. 11, 1956   B. H. MANN ET AL   2,762,350
INDUCTION SYSTEM FOR V-8 ENGINES
Filed March 14, 1955   3 Sheets-Sheet 3

INVENTOR.
BERTRAM H. MANN
LAURENCE M. GOODRIDGE
BY George R. Ericson
ATTORNEY

United States Patent Office 2,762,350
Patented Sept. 11, 1956

2,762,350

INDUCTION SYSTEM FOR V-8 ENGINES

Bertram H. Mann, Richmond Heights, and Laurence M. Goodridge, Clayton, Mo., assignors, by mesne assignments, to ACF Industries, Incorporated, New York, N. Y., a corporation of New Jersey Application March 14, 1955, Serial No. 494,115

7 Claims. (Cl. 123—55)

This invention relates to internal combustion engines of the V-8 type and consists, particularly, in a novel fuel induction system, crankshaft, and timing arrangement to produce better fueling of the individual cylinders.

Conventional V-8 automotive engines have cylinder banks of four cylinders each disposed at 90° to each other, four throw crankshafts, dual intake manifold systems, and valve timing means providing for alternate suction impulses occurring in the respective, separate intake manifold and carburetor systems. Thus, successive suction impulses in each manifold system are spaced apart 180° of crankshaft rotation tending to minimize overlapping of these impulses and the resultant robbing of fuel mixture from certain cylinders. However, the usual intake valve openings of from, say, 230° to 280°, or more, prevent complete elimination of intake overlap, even with such 180° alternate firing. Furthermore, such conventional manifolds, as diagrammed, for instance, in Voorhies Patent No. 2,271,412, have individual branches differing substantially in lengths and/or size and directness and necessitate frequent reversals in mixture flow direction. These factors result in fueling difficulties resulting in less torque or horsepower capacity and roughness due to variations in the quality and quantity of mixture supplied to the respective cylinders. Necessarily, the conventional induction systems are compromises between requirements for obtaining best velocity and vaporization of mixture and freedom of breathing and best power.

It has been suggested, for instance, in Strickland Patent No. 1,365,564 and elsewhere that certain advantages in fueling of a V-8 engine may be obtained by locating a carburetor centrally between the group of four cylinders at each end of the engine. However, so far as applicants are aware, the previous disclosures have not explored the possibilities of coordinating such an induction system or systems with special crankshaft and valve timing arrangements to provide reasonable regularity of firing and control of suction impulses in the respective manifolds.

Consequently, it is the purpose of the present invention to provide a V-8 type engine with an induction system featuring relatively short, direct, and uniform fuel passages for supplying all cylinders and reasonably regular suction impulses in the separate intake manifolds.

Another object is to provide such an engine with controlled overlap of suction impulses in each manifold to provide greatest average velocity, as by maximum overlap, or greatest capacity and freedom of breathing, as by minimum overlap.

Another object is to provide an induction system of the above type with means to substantially reduce the starving of one cylinder due to overlap of the suction impulse thereto by the intake of another cylinder communicating with the same manifold.

These objects, and others, are attained in the present invention by providing a pair of separate intake manifolds, each consisting of short, direct, uniform branch passages serving the associated valve ports and emerging tangentially from a central distribution chamber on which the carburetor is mounted so that the carbureted air assumes a circular path from which portions are periodically diverted in generally spiral paths through the tangential branches and without reversals or sharp changes in direction.

In the accompanying drawings which illustrate the invention:

Figure 1:
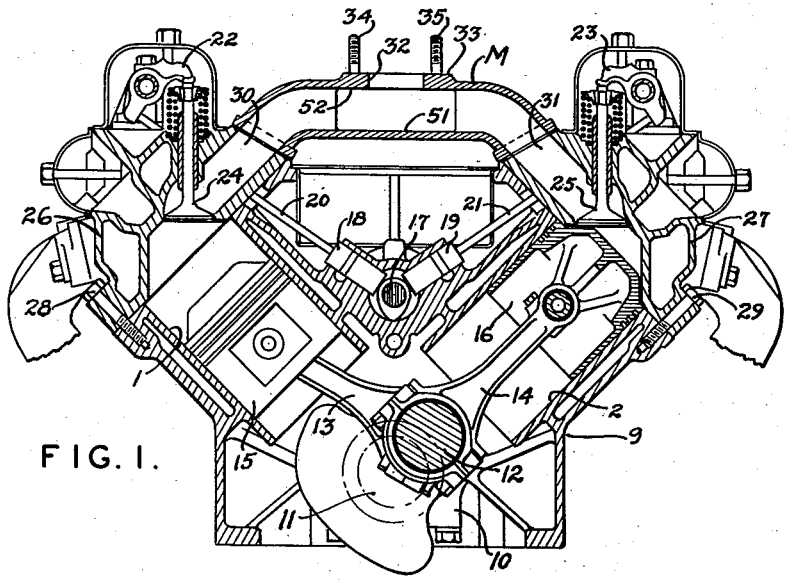
Fig. 1 is a vertical, transverse section through the front cylinders of a V-8 engine constructed according to this invention.

The V-8 engine illustrated in Fig. 1 has parallel banks of four cylinders each disposed at 90° to each other. The four cylinders in the left bank are numbered 1, 3, 5, 7, and the four cylinders in the right bank are numbered 2, 4, 6, 8, both from front to rear. As is common in this type of engine and as better shown in Fig. 4, the crankshaft has four cranks or throws, the connecting rods of cylinders 1 and 2 being journalled side by side on the first crank throw, those of cylinders 3 and 4 on the second crank throw, those of cylinders 4 and 5 on the third crank throw, and those of cylinders 7 and 8 on the fourth crank throw. The first and second crank throws are spaced 180° apart. Likewise, the third and fourth crank throws are 180 degrees apart. The intermediate, second and third crank throws, are displaced 90 degrees apart. The crankshaft rotates clockwise with respect to Fig. 1.

The section illustrated in Fig. 1 is taken on vertical transverse planes through the number 1 and number 2 cylinders. The engine block 9 has a series of longitudinally spaced crankshaft bearings, one of which is indicated as 10, in which is journaled the crankshaft 11. The crankshaft has four crank pin bearings 12, only one of which is shown. Journaled on the crank pin 12 are a pair of connecting rods 13 and 14, which carry pistons 15 and 16 working, respectively, in cylinders 1 and 2.

Mounted in bearings between the two banks of cylinders is a camshaft 17 for operating the tappets 18 and 19, respectively, and their push rods 20 and 21. The push rods extend through the engine block to operate the rocker arms 22 and 23, respectively, and their intake valves 24 and 25. Secured to the tops of the cylinder blocks are cylinder heads 26 and 27, which mount the valve gear just described. Suitable studs 28 and 29 are provided for holding the heads on the cylinder block. Each intake valve 24 and 25 controls the flow of mixture through its corresponding intake port 30 and 31, and connected with these intake ports are a pair of identical manifolds generally indicated as M and M₁, both of which have central inlets as at 32. A carburetor mounting pad 33 surrounds each inlet 32 and has appropriate studs 34 and 35 for securing a carburetor in place.

Figures 2, 3:
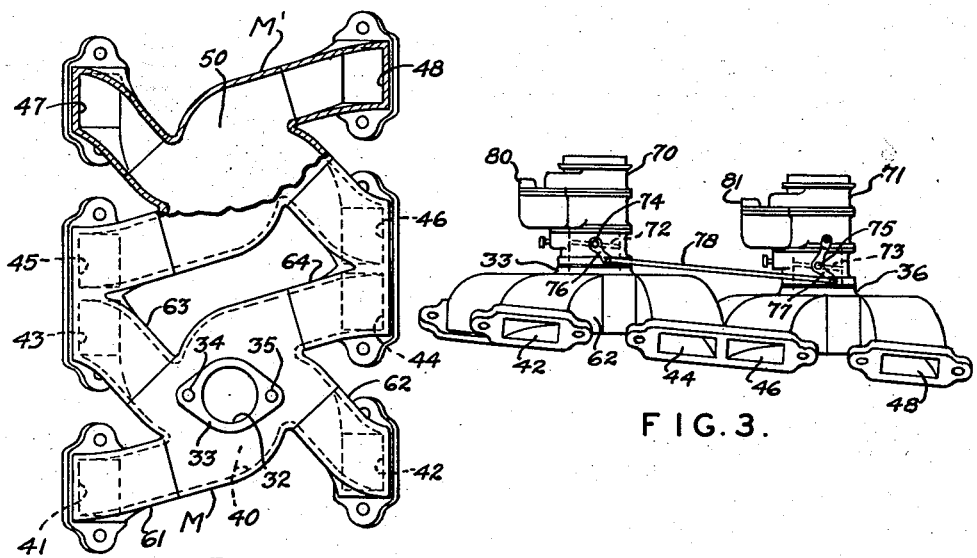
Fig. 2 is a top plan view of the manifold system with sections broken away to illustrate the arrangement of passages.
Fig. 3 is a side view of the intake manifold system showing the carburetors in place.

Fig. 2 is a top plan view of both manifolds which, when mounted between the banks of cylinders, connect carburetors 70 and 71, respectively, with the immediately adjacent engine intake ports for the group or cluster of four cylinders at each end of the engine. The forward manifold M has a pair of outlets 41, 43 for the lefthand or odd bank of cylinders, and a pair of outlets 42, 44 for the righthand or even bank of cylinders. The other manifold $M_1$ has outlets 45, 47, 46, and 48 similarly arranged. This construction provides independent dual manifolds, one for each group of four cylinders at the end of the V-8 engine, but it is contemplated that the two may be interconnected by restricted passages, for instance, adjacent outlets 43, 45 and 44, 46, for balancing reasons. Each manifold is constructed with a central distributor chamber 40, 50, each of which has a flat bottom, as at 51, a flat top, as at 52, and substantially upright sides (see Fig. 2). Each distributor chamber 40, 50 has four outlet passages, as at 61, 62, 63, and 64 formed by walls radiating substantially tangentially therefrom in a spiral manner and leading substantially directly to the associated valve ports.

In Fig. 3, the mounting pads 33 and 36 support identical carburetors 70 and 71, which may be of a conventional construction. Each carburetor has a throttle valve 72, 73 mounted on a throttle shaft 74, 75 to which is secured a throttle lever 76, 77. A link 78 interconnects the throttle levers for unison operation. Carburetor 70 has a fuel inlet connection 80, and a similar connection 81 is provided on the carburetor 71. Suitable linkage will be provided for opening the throttles upon depression of the accelerator pedal by the operator against the usual throttle return spring (not shown).

During operation of the engine, fuel and air will be discharged from the carburetors in a downward direction against the flat floors 51 of the distribution chambers 40, 50. The fuel which is in suspension will follow the air stream, which is deflected outwardly in a spiral manner due to the tangential arrangement of the manifold passages 61, 63, 64, and 62. As the intake valves of the engine open, charges will be drawn from the carburetors through the distribution chambers and manifolds. Because of the spiral arrangement of the passages, the flow in this chamber will be caused to rotate continuously in a clockwise direction, and no reversal in flow will occur. For example, if gas is flowing simultaneously from the opposite outlets 41, 42, and 43 to cylinders 1, 2, and 3, the clockwise rotating air and fuel mixture within the distribution chamber will be readily available to supply the demand. The simultaneous discharge will merely increase the velocity imparted to the flow in the carburetor and manifold branches.

The rotating forces produced by the spiral flow of gases within the distribution chambers 40 and 50 will have a marked effect upon any liquid fuel which drops out of suspension in the flow. Fuel on the inner walls and bottom of the chambers 40 or 50 will tend to move in the same manner, and the centrifuge effect will cause outward movement of the liquid into the passages, where it will be snatched by the intake impulses. Moreover, it is obvious that the gas does not have to flow along long passages or back and forth in the same passage system in order to reach its destination. Rather, the flow is wholly undirectional and follows a plurality of diverging, spiral, short, direct paths from carburetor to intake port.

Figure 4:
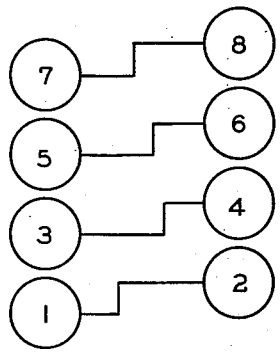
Fig. 4 is a view showing the schematic arrangement of cylinders, cranks, and connecting rods in the engine.
Figure 9:
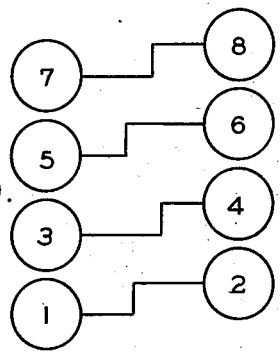
Fig. 9 is a view similar to Fig. 4, but showing a modified crank and connecting rod arrangement.

In Fig. 4 the interconnection of the particular connecting rods in pairs with the throws of the crankshaft has been illustrated, which is the usual arrangement, with cylinders 1 and 2, 3 and 4, 5 and 6, and 7 and 8 connected with cranks one to four, respectively.

Figs. 5 to 8 diagrammatically illustrate, on an enlarged scale, the crankshaft used with the novel engine, with numbers opposite each crank throw indicating the interconnection with pistons in the cylinders as numbered in Fig. 4.

Figure 5:
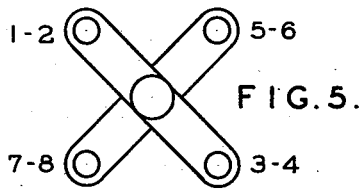
Figs. 5-8 are diagram representations of the crankshaft in four rotational positions spaced 90° apart.
Figure 6:
Figure 7:
Figure 8:
Figure 10:
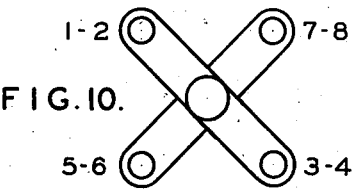
Figs. 10-13 are diagrammatic representations of the modified crankshaft in four positions of rotation spaced 90° apart.
Figure 11:
Figure 12:
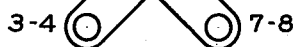
Figure 13:

The cranks, as stated, rotate clockwise, and the Figures 5 to 8 show, in sequence, 90-degree rotations of the cranks, starting in Fig. 5 with piston 1 on top dead center. Since it is possible for the odd cylinders to fire only in the left bank, and the even cylinders only in the right bank, then, from the diagrams in Figs. 5 to 8, the possible firing positions, listed in consecutive order, are:

Fig. 5—1 or 6
Fig. 6—7 or 2
Fig. 7—3 or 8
Fig. 8—5 or 4

With this arrangement of crankshaft throws and interconnections with the pairs of cylinders in the order set forth, a desired firing order may be easily selected from the list of possible firing positions.

In order to obtain optimum capacity or horsepower output from the engine at high speeds, the firing order should be such as to reduce overlap of suction impulses so that a given manifold will have maximum effective capacity. This is accomplished by reducing, so far as possible, two cylinders drawing mixture successively from the same manifold, which results in a lowest volume of gas flowing through the particular carburetor and manifold branch at a given moment. For this purpose, there are two exemplary firing orders which may be readily selected from the above list of possible firing positions. The first is 1–7–3–5–6–2–8–4. With this firing order, notwithstanding the customary intake valve opening of from 230 to 280 degrees of crankshaft rotation, there will be extra overlapping intake impulses only between the intake strokes of cylinders 5 and 6 and 4 and 1, which are only 90 degrees apart. Since these intervals occur in different manifolds, the other three intervals between initial opening of the intake valves associated with each manifold in sequence, will involve normal or less than normal overlap.

Figure 14:
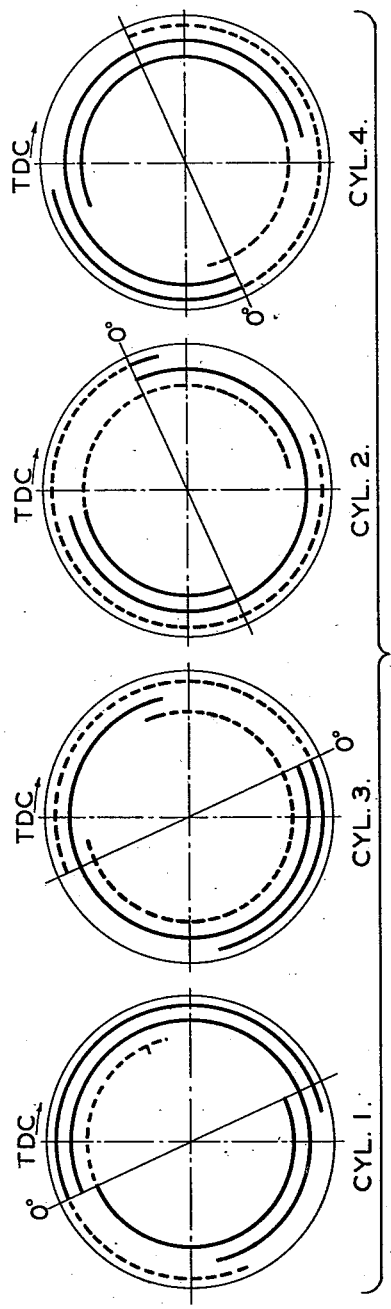
Fig. 14 is a diagrammatic representation of minimum overlap in suction impulses in one of the manifolds of Figs. 1-8 obtained with the firing order of 1-7-3-5-6-2-8-4.

The intake valve timing diagrams shown in Fig. 14 graphically illustrate the relatively minor period during the two crankshaft revolutions required to complete the four cycles of the four cylinders associated with forward manifold M when there are abnormal suction impulse overlaps. Each of the diagrammatic circles represents a 360-degree period of crankshaft rotation starting with the opening of one intake valve and taken in sequence. The fragmentary curved lines in each diagram represent the period of opening of one intake valve, together with the openings of the preceding and the following valves, the portions of the latter two curves, not occurring in the particular cycle, being dotted. The valves are assumed to open at 25 degrees before top dead center and close at 77 degrees past bottom dead center, as in a current high-power V-8 engine. With respect to currently standard manifold practice as explained above, involving regular 180-degree intervals between intake impulses in one manifold, the illustrated overlap is somewhat greater during one interval (Fig. 14, cylinder 4), less during another (Fig. 14, cylinder 3), and the same during the remaining periods. Moreover, the regularity of firing is the optimum which can be obtained with the presently described, more efficient intake manifolding and a four-throw crankshaft.

The second possible firing order which produces the minimum of suction impulse overlap is 1–2–8–4–6–7–3–5. With the use of this firing order, extra overlap would occur only between the intake impulses of cylinders 1 and 2 and 6 and 7, the only 90-degree intervals. The other suction impulses all occur alternately in the separate manifolds, with 180-degree spacing between impulses in one manifold. With both of the described firing orders, the suction impulses of at least three cylinders in each manifold group will be preceded and followed by impulses spaced at 180 degrees of crankshaft rotation therefrom.

Figure 15:
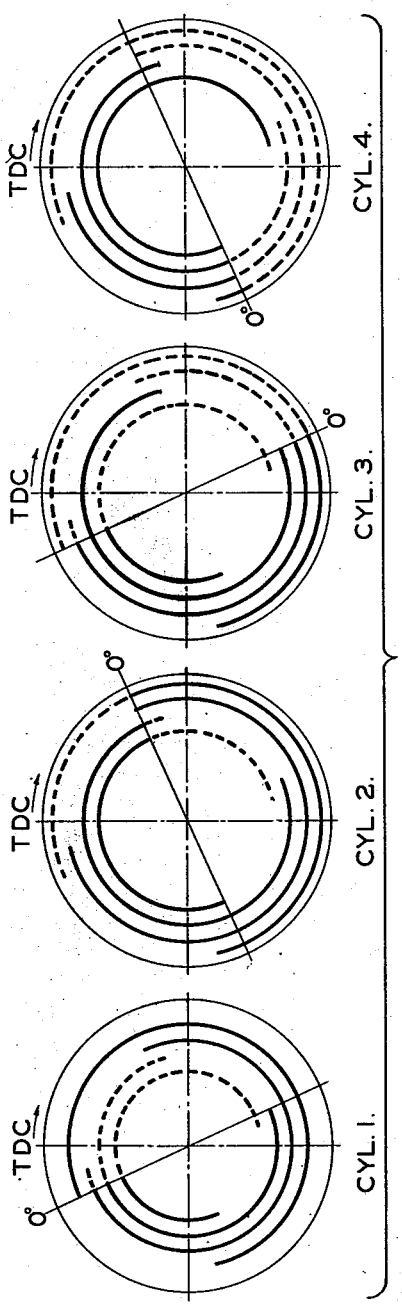
Fig. 15 is a diagrammatic representation of maximum overlap in suction impulses in one manifold of Figs. 1-8, obtained with the alternative firing order 1-2-3-4-6-7-8-5.

In order to obtain the highest torque during low-speed operation, incident to improvement of carburetion and manifolding at such times, it is desirable to select a firing order producing the highest velocity of gas flow in this speed range. This result is obtained, theoretically, when all of the cylinders in one manifold have intake strokes during one revolution of the crankshaft and, therefore, are spaced only 90 degrees apart. The advantages of such spacing may be obtained, of course, only if the manifolding is such as to insure adequate fuel supply to each cylinder under such conditions. It can be readily seen that with such an arrangement, for a given engine speed, the average rate of gas flow through a particular induction passage will be at increased speed with respect to the situation where suction impulses are spaced at 180 degrees apart, as in the previous examples. Thus, a relatively larger carburetor and manifold can be selected. From the previous list of possible firing positions taken from Figs. 5-8, the following firing order may be selected, which will produce the maximum of sequential and overlapping intake strokes in each manifold:

For example, the firing order 1-2-3-4-6-7-8-5 is possible, which will give maximum overlapping between the intake impulses of cylinders connected to one manifold. Fig. 15 represents diagrammatically the overlap conditions in the forward manifold, as in Fig. 14. Extra overlapping will occur in the three intervals between the beginning of the intake strokes of cylinders 1 and 2, 2 and 3, 3 and 4, in one manifold, and 6 and 7, 7 and 8, and 8 and 5, in the other manifold (Fig. 15, cylinders 1, 2 and 3). Less overlap will occur during the remaining cycle in each manifold, for instance, following cylinder 4, when there will be a pause while the four cylinders connected to the other manifold fire. The novel manifold construction described prevents the starving of individual, overlapped cylinders where the carburetor has adequate capacity.

In Figs. 9-13, the same cylinder arrangement has been shown with a different crankshaft, which lends itself to different firing orders, providing for minimum or maximum overlap of intake strokes. The arrangement of the crank throws is illustrated in Figs. 10 to 13, inclusive. From these figures it is apparent that the positions of the third and fourth cranks of the crankshaft have been reversed. In this crankshaft the first and second cranks for cylinders 1, 2, 3 and 4 are opposite. Likewise, the third and fourth cranks are opposite, but are reversed in position from those shown in Figs. 5 to 8, inclusive.

From the diagrammatic showing of the crankshaft positions, the following possible schedule of firing positions is derived:

Fig. 10—1 or 8
Fig. 11—5 or 2
Fig. 12—3 or 6
Fig. 13—7 or 4

From this schedule of sequential positions of the pistons in the cylinders, it is possible to have the following firing order: 1-5-3-7-8-2-6-4. Likewise, it is possible to fire the cylinders in the order of 1-2-6-4-8-5-3-7. These firing orders will give the minimum of overlap in one manifold, and would be preferable for maximum power at top engine speeds. It is contemplated that this arrangement of crankshaft, firing order, and manifolding, as shown, will provide for adequate engine performance, particularly at high capacity operation, without resort, for instance, to separate high-speed and high-power features such as multi-stage carburetors and/or manifolds.

To obtain maximum torque at lower speeds, a firing order of 1-2-3-4-8-5-6-7 is possible with the same piston positions. This will give an extra overlap between cylinders 1 and 2, 2 and 3, and 3 and 4 in the front manifold, and 8 and 5, 5 and 6, and 6 and 7 in the rear manifold, somewhat as in Fig. 15. Likewise a firing order of 1-2-6-7-8-5-3-4 is possible with this same piston relation. This would produce sequential firing of 3, 4, 1 and 2 in the front manifold, and 6, 7, 8 and 5 in the rear manifold, giving the maximum amount of overlap. With these firing orders, the average speed of the mixture passing through the induction system would be maximum and would be approximately equal to that at fifty per cent greater engine speed with a conventional V-8 engine, since the induction of four cylinders in one manifold takes place within one revolution of the crank instead of two. This higher speed flow is beneficial to both carburetion and distribution, making the application of heat unnecessary. Cooler temperatures mean greater volumetric efficiency and torque. At the same time, the novel manifold shape, consisting of spiral branches leading to each port, provides for adequate feeding of fuel to all cylinders.

The firing orders and crankshafts described are selected as exemplary, and are for that purpose only. It is contemplated that the spirit of the invention may be carried out by other engine structures which come within the scope of the appended claims.

We claim:

1. In combination in an internal combustion engine having parallel rows of cylinders with pistons working therein, an induction system for said engine comprising separate intake manifolds for the groups of cylinders at opposite ends of said engine, each manifold including a plurality of outlets for communication with the cylinders of the associated group, a central distribution chamber, an intake for said chamber located substantially equidistant from said outlets, and a plurality of passages extending from said distribution chamber in tangential relation to said intake substantially directly to said outlets whereby the paths of flow from said inlet to the outlets connected thereto are along substantially uniform, spiral paths extending in the same rotational direction so that fuel is distributed to the several outlets by centrifugal action.

2. In combination in a V-type internal combustion engine having banks of cylinders with pistons working therein, an induction system for the engine comprising separate intake manifolds located between said banks and each serving a group of symmetrically arranged cylinders, each manifold consisting of centrally merging substantially spiral, similar passages for communication with the cylinders of the associated group and a central inlet whereby the paths of flow from said inlet to said outlets are along spiral curves extending in the same rotational direction so that centrifugal action of the gas causes uniform fuel distribution.

3. In combination in a four-cycle internal combustion engine having parallel banks of cylinders with pistons working therein, valve ports, intake valves, and valve actuating means for holding said intake valves open during substantially more than 180 degrees of crankshaft rotation, an induction system for said engine comprising separate intake manifolds between said banks, each manifold serving a group of adjacent cylinders and having an inlet located substantially equidistant from said ports, and similar passages leading substantially directly to said ports and each constituting the sole means of air supply to the associated port, and a crankshaft having crank pins, each connected to a pair of adjacent pistons, one in each bank, said cranksaft having a pair of throws spaced at 180 degrees apart associated with each of said cylinder groups and adjacent intermediate throws, each serving a pair of cylinders in a different cylinder group spaced at 90 degrees apart, whereby the engine may be timed so that the induction strokes of all but one cylinder in each of said groups occur in sequence or alternately to provide, respectively, maximum or minimum overlap of intake impulses in each manifold.

4. The combination specified in claim 3 in which said engine consists of banks disposed at 90 degrees to each other, each bank having four cylinders and said crankshaft having four throws, adjacent throws at each end of said crankshaft being spaced apart 180 degrees and the intermediate pair of throws being spaced apart 90 degrees.

5. In combination in a four-cycle, V-8 engine having banks of four cylinders each with pistons working therein and an intake and an exhaust valve for each cylinder, and valve ports, an induction system comprising separate intake manifolds each serving the group of four cylinders at each end of the engine and each consisting of an inlet located substantially equidistant from the associated valve ports and connected thereto by uniform, substantially direct passages, a crankshaft having four throws each connected to a pair of adjacent cylinders, one in each bank, the pair of cranks at each end being angularly spaced at 180 degrees apart and the intermediate pair of cranks being spaced at 90 degrees apart, and valve actuating means constructed and arranged in relation to said crankcase to cause the intake valves for three of the four cylinders in each of said groups to open alternately between groups so as to produce minimum overlap of suction responses in each manifold.

6. In combination in a four-cycle, V-8 engine having banks of four cylinders each with pistons working therein and an intake and an exhaust valve for each cylinder, and valve ports, an induction system comprising separate intake manifolds each serving the group of four cylinders at each end of the engine and each consisting of an inlet located substantially equidistant from the associated valve ports and connected thereto by uniform, substantially direct passages, a crankshaft having four throws each connected to a pair of adjacent cylinders, one in each bank, the pair of cranks at each end being angularly spaced at 180 degrees apart and the intermediate pair of cranks being spaced at 90 degrees apart, and valve actuating means constructed and arranged in relation to said crankshaft to cause the intake valves for three of the four cylinders in each of said groups to open three in one group and three in the other so as to produce maximum overlap of suction impulses in each manifold and thereby improve the efficiency thereof.

7. In combination in a four-cycle, V-8 engine having banks of four cylinders each with pistons working therein and an intake and an exhaust valve for each cylinder, and valve ports, an induction system comprising separate intake manifolds each serving the group of four cylinders at each end of the engine and each consisting of an inlet located substantially equidistant from the associated valve ports and connected thereto by uniform, substantially direct passages, a crankshaft having four throws each connected to a pair of adjacent cylinders, one in each bank, the pair of cranks at each end being angularly spaced at 180 degrees apart and the intermediate pair of cranks being spaced at 90 degrees apart, and valve actuating means constructed and arranged in relation to said crankcase to cause the intake valves for three of the four cylinders in each of said groups to open three in one group and three in the other so as to produce maximum overlap of suction impulses in each manifold and thereby improve the efficiency thereof, said connecting passage portions of each manifold extending substantially tangentially from a central distributing chamber so as to tend to cause uniform fuel feeding to each cylinder irrespective of intake overlap.

References Cited in the file of this patent

UNITED STATES PATENTS

| | | |
|---|---|---|
| 1,365,564 | Strickland | Jan. 11, 1921 |
| 2,098,424 | Kolimbat | Nov. 9, 1937 |
| 2,127,079 | Barkeij | Aug. 16, 1938 |
| 2,199,276 | Barkeij | Apr. 30, 1940 |

FOREIGN PATENTS

| | | |
|---|---|---|
| 515,410 | Great Britain | Feb. 28, 1938 |
| 450,084 | Italy | July 7, 1949 |